J. THOMPSON.
Making Gun Barrels.
No. 42,718. Patented May 10, 1864.
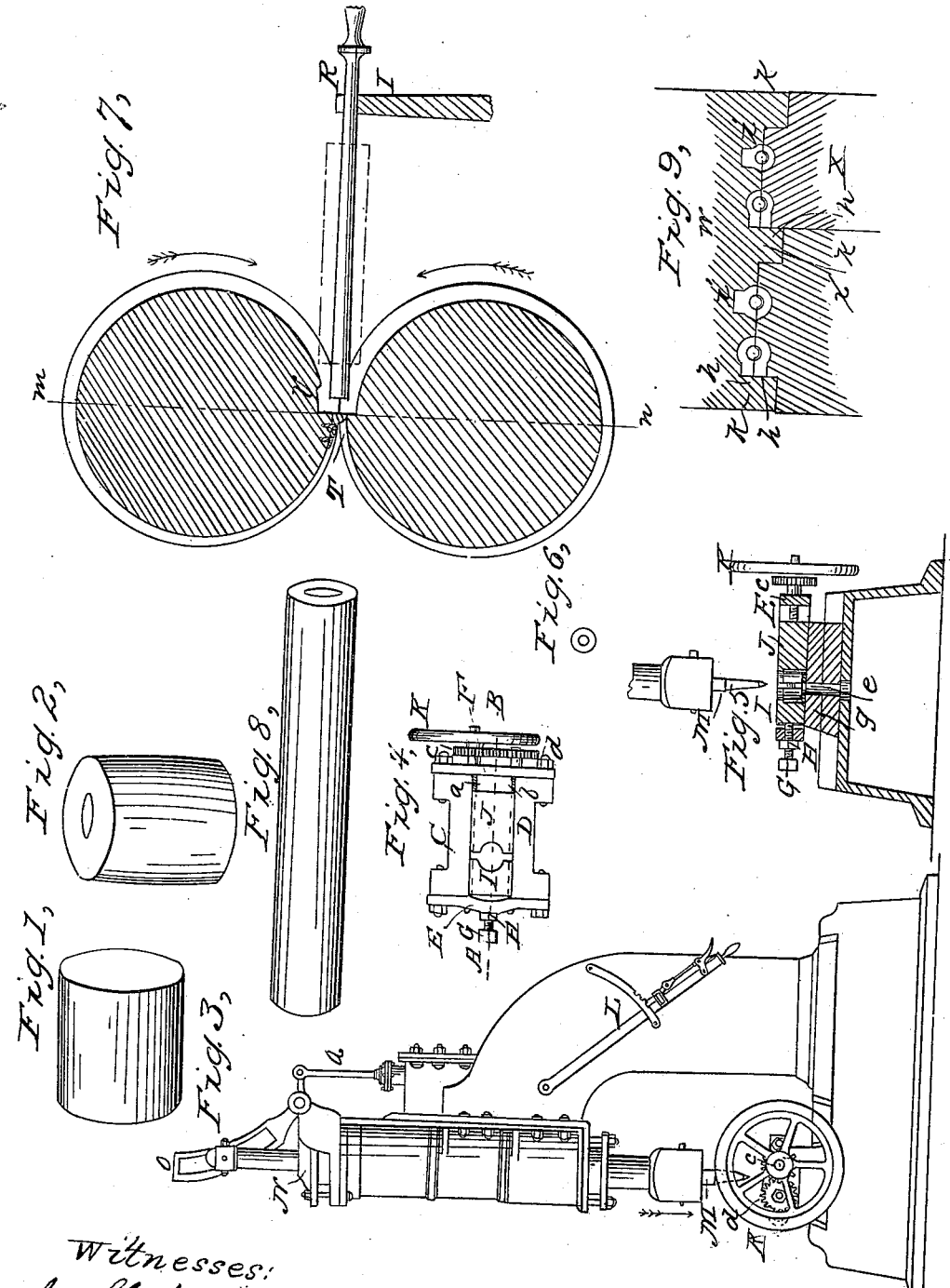

UNITED STATES PATENT OFFICE.

JAMES THOMPSON, OF BILSTON, ENGLAND.

IMPROVEMENT IN THE MANUFACTURE OF GUN-BARRELS.

Specification forming part of Letters Patent No. 42,718, dated May 10, 1864.

*To all whom it may concern:*

Be it known that I, JAMES THOMPSON, of Bilston, in the county of Stafford, England, have invented certain Improvements in the Manufacture of Fire-Arms and Ordnance for Military, Naval, and other Purposes; and I do hereby declare that the following is a full, clear, and exact description of the same, reference being had to the annexed drawings, making a part of this specification.

The essential nature or quality of my invention consists in the manufacture of gun-barrels or ordnance of iron, steel, or other desired metal perfectly seamless and without weld of any kind, and hollow, whereby the trouble of drilling is obviated and the quality of the metal improved by extra condensation. This I effect by proceeding in the following way: For making gun-barrels, I take a bloom, block, or ingot—say of steel or iron—and after heating it in a suitable furnace I reduce it into a cylindrical form by passing it through suitably-grooved rolls. In this condition, and by preference while yet hot, I take it to a circular saw and cut it up into suitable lengths for military gun-barrels—three and three-quarter inches long and three and three-quarter inches in diameter will do well. The pieces thus cut off are again heated and brought under the operation of a suitable punching-machine that punches a hole through or partially through, as may be required, its center by forcing the metal from the center into the surrounding parts. From this operation I place it on a taper or suitable mandrel or bar as a means of holding it while I beat it in suitable swages by means of a tilt or other hammer, the metal being heated for this purpose. This operation is important, as it condenses, stiffens, and elongates the metal, and at the same time affords an opportunity to the operator for leaving the part intended for the breech end larger than the other, as may be required. From this stage it is again heated, to be elongated and regulated on the interior by being passed between rolls so fashioned that the enlarged part or parts usually required at the breech end and at other parts of a gun-barrel may be formed at this operation; but when manufacturing ordnance a sufficient quantity of iron or steel or other metal, according to the size of gun desired to be made, must be prepared and taken in a heated state, if the nature of the metal requires it, first to the partial shaping through the rolls, as before stated, or by means of a tilt-hammer, and from there to the operation of the punching-machine, to be punched through or partially through the center, applying in this, as in the former case, external pressure around the metal during the time the metal is being pressed or punched out from the center into the surrounding body, after which I proceed to elongate and reduce the metal so formed to the desired shape, using during this operation internal pressure, the gun to be bored, turned, and otherwise finished in the ordinary way.

Figure 1 in the annexed drawings represents a cylinder—say of steel or iron—cut off from an elongated bloom or ingot, as before stated; and Fig. 2 is the same after the hole has been punched through its center. Both figures are drawn to about one-half the size required. Fig. 3 represents in a side view a machine or apparatus which I have found to be most convenient for effecting the operation of punching, arranged to be put to work by steam-power. Fig. 4 represents a top view of the bed portion of Fig. 3; and Fig. 5, a vertical section of the last figure, taken through the dotted line A B.

This machine or apparatus is nothing more than an ordinary steam-hammer, adapted for giving effect to that portion of my invention to which it appertains—namely, punching the metal from the center into the body of the same, so as to form a gun-barrel or ordnance without a weld or joint.

The arrangement of this machine will be understood from the following description: The parts C and D, Fig. 4, are united together in a solid mass below and formed with lugs, as here shown, for receiving the screws by which the parts E and F are held to it, and through the part E the set-screw G works and is fixed to its setting by the lock-nut H, by which means the part I is held in position, while the part J is provided with a traversing motion by means of right and left handed screws *a* and *b*, working in collars, or other equivalent means, through the plate F, the two screws being connected by the two pinions *c* and *d*, put in motion by the wheel K. It will be seen from this that by means of lateral projections or nuts fixed or applied to the sides of J for the screws *a* and *b* to work through, and corresponding grooves being formed in C and D, by turning the wheel K forward or backward a traversing motion will be imparted to the part J. From this it will be seen that, the part I being adjusted so that the hole marked $e$ in Fig. 5 shall be centrally beneath the punch, the operator has only to place the cylinder of metal, as represented at Fig. 1, in position, and by means of the wheel K advance the part J until it is securely held and clipped between the corresponding circular parts, and by placing the spring-lever L in the position shown, which corrects the valve for admitting the steam above the piston, thereby causing the punch M to descend to impart a blow or force, according to the pressure of steam and area of piston, to the cylinder of metal below, and as the piston descends its upper extension-rod, that works through the stuffing-box N, corrects or reverses the steam from above and admits it below by means of a small wheel secured on the reverse side of the top end, working through the curved slot of the lever O, which, working on the fulcrum P, elevates the slide-valve by the rod Q, leaving the apparatus in position for the operator at pleasure to admit the steam on the top of the piston for repeating the blow as may be required; but in a general way for punching such cylinders as may be required for small-arm barrels three or four blows I have found sufficient. During the performance of this operation I prefer laying over the hole $e$ in the bed (shown in section, Fig. 5) a steel disk (marked $g$, represented separate and in a flat view at Fig. 6) with a hole in the center but slightly in excess of the size of the lower end of the punch I may at the time be using, and the parts I and J may be divided, so that the circular parts for clipping the cylinder to be operated on may be varied as required; and I prefer using the punch slightly taper, as it assists the counterpressure of the steam to lift the punch from the metal it had been driven or forced into. Nevertheless, a cylindrical punch may be used, if necessary. The next operation—namely, that of stiffening and partially elongating the billet or piece of metal before punched in suitable swages and the operation of a tilt or other suitable hammer—is so simple and common in the fabrication of various articles that I have not thought it necessary to exhibit the same in the drawings. The succeeding operation I perform by rolls suitably grooved and geared together, (exhibited in a transverse section at Fig. 7 and a part longitudinal section at Fig. 9,) the novelty of which consists in providing a series of stops that the operator may readily apply the partially-formed mold against the desired stop, that as the rolls revolve so the metal or mold for the barrel will be passed through or between the desired grooves, leaving it parallel, as exhibited at Fig. 8, which is drawn to about half-size, and in effecting this the operator puts the punched and hammered piece of metal, as exhibited in dotted lines marked S, heated or otherwise, as it may require, over a mandrel, as exhibited broken off, for convenience of space, at R in Fig. 7, in front of the rolls to advance the end of the partially-formed gun-mold S against the stop T, while the enlarged part of the mandrel R drops into a notch formed in the stay U, which is secured in front of the rolls, and holds or retains the mandrel R in position while the gun-mold S is taken by the action of the rolls through or between the grooves it may be desired to pass it between, and thereby drawn off or over the thick end of the mandrel R. When enlargements are required at the breech end of such partially-formed barrels, the counter shape of such enlarged parts is sunk or recessed at the bottom of the groove in one roll near the stop before referred to, as at V, or in opposite or corresponding parts in both rolls in proximity to their periphery in connection with collars or necks formed on the rolls, as partly exhibited in the section, Fig. 9, taken through the dotted line $m\ n$ in the last figure. This view represents just as much of a top roll, W, and bottom roll, X X, which may be in one or two parts, as here shown, necessary for exhibiting and explaining how I purpose arranging the sunken parts in the meeting of the rolls, that when they are geared together any enlarged part desired at the breech end of the barrel may be formed by the joint action of both rolls, as at $h\ h$, and in the grooves $i\ i$, by which means the barrel may be turned from the position $h\ h$ to that of $i\ i$, and the fins formed by the meeting of the rolls in the first case will be reduced in the second.

The advantages of the projecting collars $k\ k$ are twofold, as they keep the grooves opposite each other and form a base to the recesses $h\ h$ during the time the enlargement is being formed, the rolls being sufficiently extended and grooves added as may be necessary to reduce the gun-mold down to its proper shape, and other projections that may be required on gun-barrels may be formed in like manner by recesses properly placed in the grooves before referred to.

From the foregoing description I claim as my invention—

The manufacture of fire-arms or ordnance of iron, steel, or other desired metal, without weld or joint of any kind, and hollow, substantially in the manner and by the means hereinbefore described.

In testimony whereof I have signed my name to this specification in the presence of two subscribing witnesses.

JAMES THOMPSON.

Witnesses:
JAMES S. COCKING,
J. M. G. UNDERHILL.